(12) United States Patent
Lee

(10) Patent No.: US 7,107,077 B2
(45) Date of Patent: Sep. 12, 2006

(54) METHOD FOR DISPLAYING A MESSAGE IN A DUAL LCD FOLDER-TYPE MOBILE TERMINAL

(75) Inventor: Jae-Wook Lee, Daegukwangyeok-shi (KR)

(73) Assignee: Samsung Electronics Co., Ltd., (KR)

( * ) Notice: Subject to any disclaimer, the term of this patent is extended or adjusted under 35 U.S.C. 154(b) by 658 days.

(21) Appl. No.: 09/887,763

(22) Filed: Jun. 22, 2001

(65) Prior Publication Data
US 2002/0094826 A1    Jul. 18, 2002

(30) Foreign Application Priority Data
Jan. 17, 2001    (KR)    .................... 2001-2536

(51) Int. Cl.
*H04B 1/38*    (2006.01)

(52) U.S. Cl. ............... 455/566; 455/575.3; 455/550.1; 345/1.1; 345/1.2

(58) Field of Classification Search ............... 455/566, 455/567, 575.3, 550.1; 345/1.1, 1.2
See application file for complete search history.

(56) References Cited

U.S. PATENT DOCUMENTS

| | | | |
|---|---|---|---|
| 5,896,575 A | | 4/1999 | Higginbotham et al. |
| 5,956,656 A | * | 9/1999 | Yamazaki ............... 340/7.55 |
| 6,069,593 A | * | 5/2000 | Lebby et al. ............. 345/1.1 |
| 6,141,540 A | * | 10/2000 | Richards et al. ......... 455/575.3 |
| 6,147,670 A | * | 11/2000 | Rossmann ................ 345/685 |
| 6,466,292 B1 | * | 10/2002 | Kim ........................ 455/566 |
| 2002/0022503 A1 | * | 2/2002 | Lee ......................... 455/566 |
| 2002/0065110 A1 | * | 5/2002 | Enns et al. ............... 455/566 |

FOREIGN PATENT DOCUMENTS

| | | |
|---|---|---|
| EP | 0 776 140 | 4/2003 |
| GB | 2 343 324 A | 5/2000 |
| GB | 2 358 758 A | 8/2001 |
| JP | 11-015629 | 1/1999 |
| JP | 11-017579 | 1/1999 |
| JP | 11-074953 | 3/1999 |
| JP | 2001-274880 | 10/2001 |
| WO | WO 00/59179 | 10/2000 |

* cited by examiner

OTHER PUBLICATIONS

UK Search Report dated Apr. 24, 2002 issued in GB Appln. No. 0122537.4.

*Primary Examiner*—Quochien B. Vuong
*Assistant Examiner*—Angelica Perez
(74) *Attorney, Agent, or Firm*—Dilworth & Barrese LLP

(57) ABSTRACT

Disclosed is a method for displaying a message in a folder-type mobile terminal including a main body, a sub-body foldably mounted to the main body, said sub-body having a first display mounted on an outer side and a second display mounted on an inner side thereof. Upon receipt of a message, while the sub-body is folded, the mobile terminal displays an indicator indicating receipt of the message on the first display. Upon receipt of a key input corresponding to a user's external display request, the mobile terminal determines whether the first display is set to a double-line display mode. If the first display is set to the double-line display mode, the mobile terminal slidingly displays the received message on a first line of the first display and fixedly displays a message received time and a caller's phone number on a second line of the first display. However, if the first display is not set to the double-line display mode, the mobile terminal then slidingly displays, in sequence, the received message, the message received time and the caller's phone number on the first display.

10 Claims, 5 Drawing Sheets

METHOD FOR DISPLAYING A MESSAGE IN A DUAL LCD FOLDER-TYPE MOBILE TERMINAL

PRIORITY

This application claims priority to an application entitled "Method for Displaying Message in a Folder-Type Mobile Terminal" filed in the Korean Industrial Property Office on Jan. 17, 2001 and assigned Serial No. 2001-2536, the contents of which are hereby incorporated by reference.

BACKGROUND OF THE INVENTION

1. Field of the Invention

The present invention relates generally to a mobile terminal, and in particular, to a method for displaying a message in a folder-type mobile terminal.

2. Description of the Related Art

In general, a mobile terminal is classified as either a bar-type terminal or a foldable terminal. The bar-type terminal includes a keypad exposed to the outside environment and has become unpopular because of its large and awkward size. However, the foldable terminal has become popular for its compact size and is comprised of a main body and a sub-body foldably mounted to the main body, which protects the keypad mounted on the main body.

The foldable terminal can be divided into three categories: a flip-type terminal, a flip-up-type terminal and a folder-type terminal. The flip-type terminal has a flip cover, which serves two purposes: (1.) the flip-type terminal includes a sub-body to protect the keypad mounted on the main body; and (2.) it also forces the user to concentrate his voice onto a microphone mounted on the main body, because the microphone is placed close to the user's mouth. The flip-up-type terminal is featured by the flip cover, which is openable toward the upper side of the main body. The folder-type terminal has an LCD (Liquid Crystal Display) module mounted on the sub-body.

Recently, folder-type terminals tend to include two LCDs mounted on both sides of the sub-body. Such a folder-type terminal is called a "dual LCD folder-type terminal." That is, the dual LCD folder-type mobile terminal includes an external front LCD mounted on the outer side of the sub-body and an internal LCD mounted on the inner side of the sub-body. The external front LCD is relatively smaller in window size than the internal LCD. In a suspended state (or stand-by state), the dual LCD folder-type mobile terminal uses the external front LCD to display information such as received signal strength indicator (RSSI) bar, battery icon, date and time, so that the user can obtain such information without unfolding the sub-body. Upon receipt of an incoming call, the dual LCD folder-type mobile terminal displays a specific icon or message indicating receipt of the incoming call on the external front LCD. In this state, if the user unfolds the sub-body, the call is connected. Likewise, upon receipt of a character message, the dual LCD folder-type mobile terminal displays a specific icon or message indicating receipt of the character message on the external front LCD. In this state, if the user unfolds the sub-body, the received character message is displayed on the internal LCD. The icon indicating receipt of the character message will be continuously displayed on the external front LCD until the user unfolds the sub-body. That is, in order to check the received character message, the user must perform the annoying task of unfolding the sub-body and reading the character message displayed on the internal LCD.

SUMMARY OF THE INVENTION

It is, therefore, an object of the present invention to provide a message display method for enabling a user to easily check a received message in a dual LCD folder-type mobile terminal.

It is another object of the present invention to provide a message display method for enabling a user to check a received message without unfolding a sub-body in a dual LCD folder-type mobile terminal.

To achieve the above and other objects, there is provided a method for displaying a message in a folder-type mobile terminal including a main body, a sub-body foldably mounted to the main body, the sub-body having a first display mounted on an outer side and a second display mounted on an inner side. Upon receipt of a message, while the sub-body is folded to the main body, the mobile terminal displays an indicator indicating receipt of the message on the first display. Upon receipt of a key input corresponding to a user's external display request, the mobile terminal determines whether the first display is set to a double-line display mode. If the first display is set to the double-line display mode, the mobile terminal slidingly displays the received message on a first line of the first display and fixedly displays a message received time and a caller's phone number on a second line of the first display. However, if the first display is not set to the double-line display mode, the mobile terminal also slidingly displays, in sequence, the received message, the message received time and the caller's phone number on the first display.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

Figure 1A:
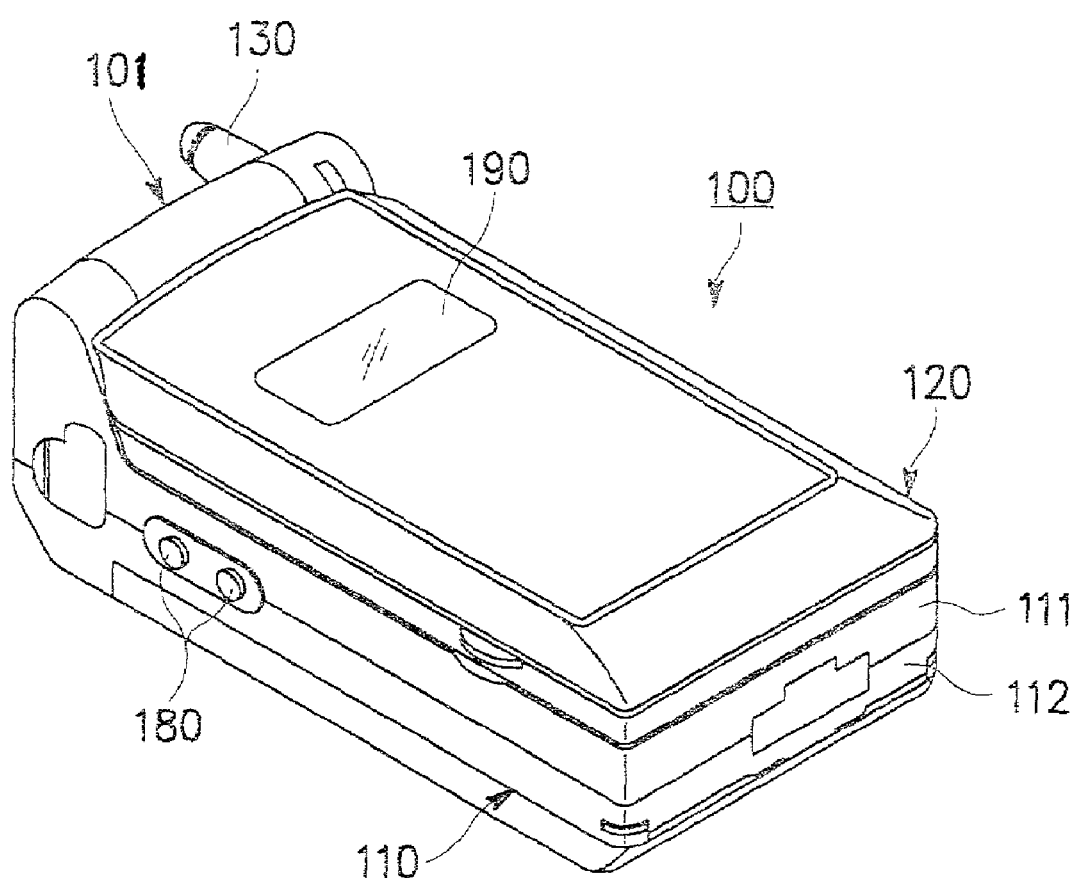
FIG. 1A is a perspective view illustrating a dual LCD folder-type mobile terminal with a sub-body folded.
Figure 1B:
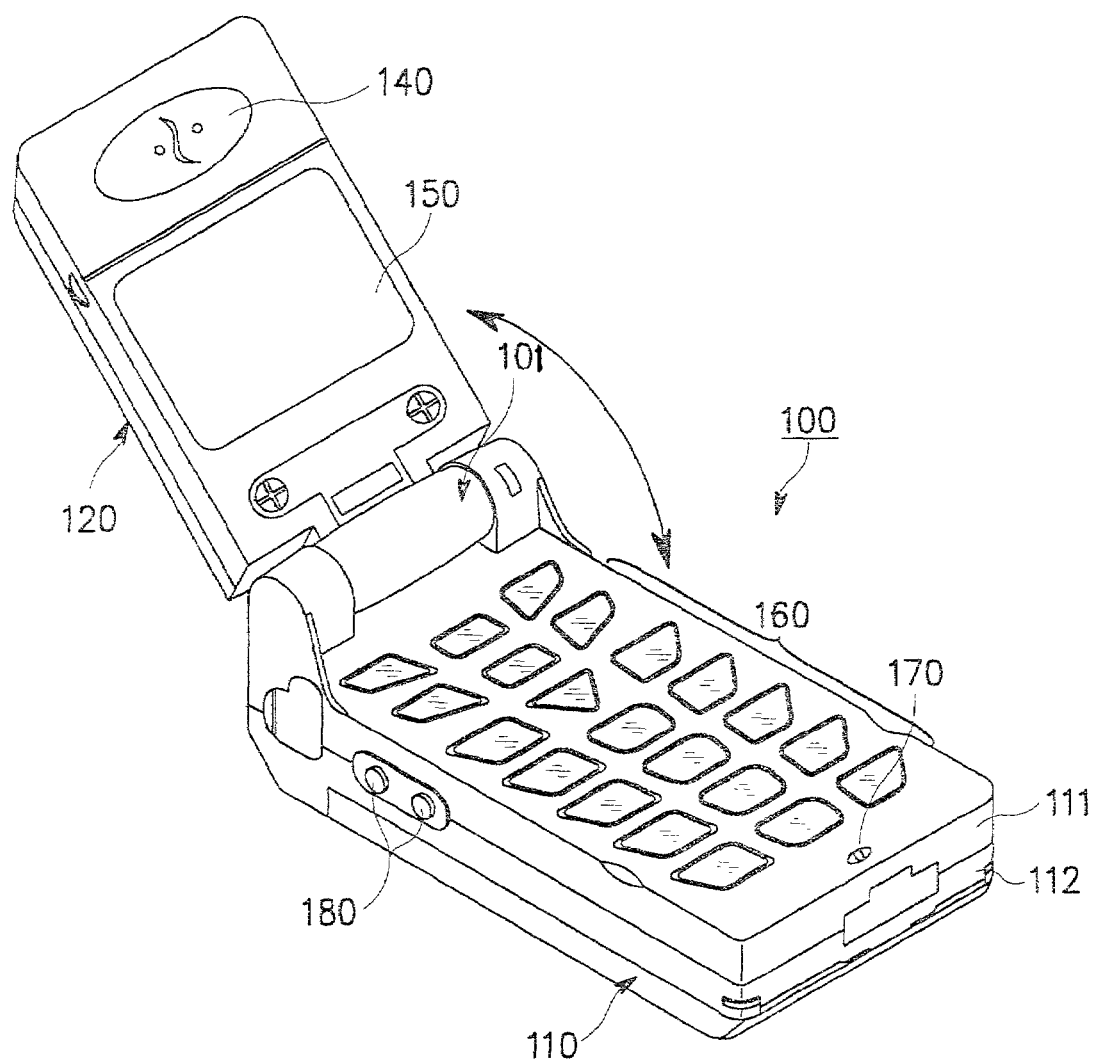
FIG. 1B is a perspective view illustrating the dual LCD folder-type mobile terminal with the sub-body unfolded.

FIG. 1A illustrates a dual LCD folder-type mobile terminal 100 to which the present invention is applied, wherein a sub-body 120 is folded to a main body 110. FIG. 1B illustrates the dual LCD folder-type mobile terminal 100 with the sub-body 120 unfolded from the main body 110.

Referring to FIGS. 1A and 1B, the dual LCD folder-type mobile terminal 100 includes a hinge device 101, the main body 110 comprised of an upper casing frame 111 and a lower casing frame 112, and the sub body 120 for protecting a keypad 160 mounted on the main body 110. The hinge device 101 mechanically connects the main body 110 to the sub-body 120. The main body 110 has a volume up/down function key 180 mounted on its side. Further, the antenna device 130 is mounted on a selected one side at an upper end of the main body 110. As shown in FIG. 1B, the sub-body 120 coupled at a lower end to the main body 110 has the earpiece 140 mounted on its upper part, and the internal LCD 150 situated at the lower part of the earpiece 140. Further, as illustrated in FIG. 1A, the sub-body 120 has the external front LCD 190 mounted on its outer side. The main body 110 also includes the keypad 160 and a microphone 170 mounted thereon.

Figure 2:
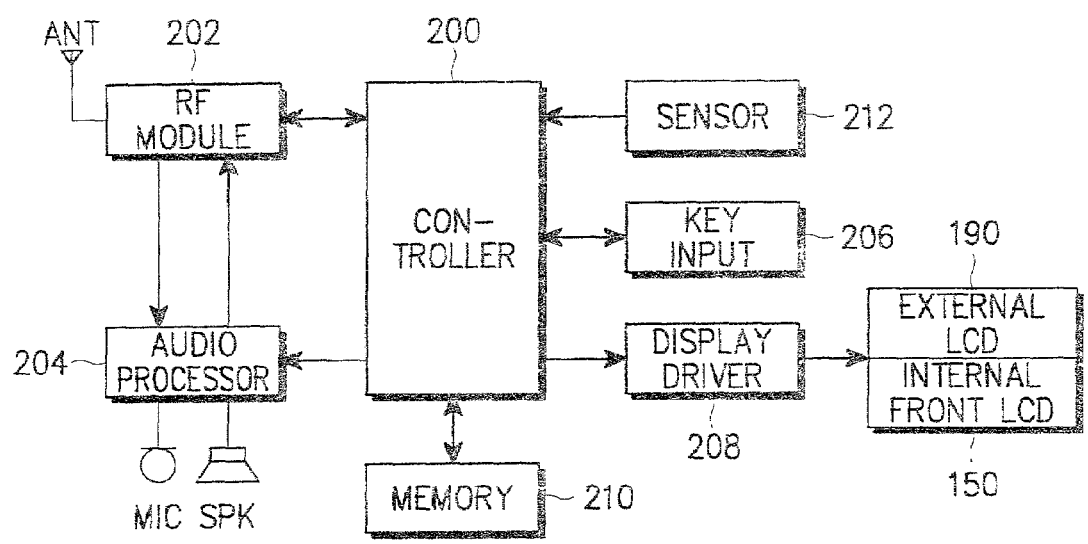
FIG. 2 is a schematic block diagram illustrating the dual LCD folder-type mobile terminal.

FIG. 2 illustrates a schematic block diagram of the dual LCD folder-type mobile terminal 100. Referring to FIG. 2, a controller 200 controls the overall operation of the dual LCD folder-type mobile terminal 100. RF (Radio Frequency) module 202 transmits and receives audio data and signaling data under the control of the controller 200. Audio processor 204, under the control of the controller 200, converts digital audio data received from the RF module 202 to an analog audio signal and outputs the converted audio signal through a speaker SPK as an audible signal. Further, the audio processor 204 converts an audio signal received from a microphone MIC to digital audio data and provides the converted digital audio data to the RF module 202. Key input unit 206 includes a plurality of alphanumeric keys and function keys, and provides the controller 200 with key input data corresponding to a key pressed by the user. LCD driver 208 displays various messages on the external front LCD 190 and/or the internal LCD 150, under the control of the controller 200. Memory 210 includes a program memory for storing program data used in controlling an operation of the dual LCD folder-type mobile terminal, and a data memory for storing data generated during the control operation or input by the user. Sensor 212 detects an unfolded state of the sub-body 120 of the dual LCD folder-type mobile terminal and provides a resulting sensing signal to the controller 200.

In an exemplary embodiment of the present invention, upon receipt of a character message or a broadcasting message, the dual LCD folder-type mobile terminal displays the received message on the external front LCD 190, so that the user can check (or read) the received message without unfolding the sub-body to review the message on the internal LCD 150. Considering the fact that the external front LCD 190 is relatively smaller in window size than the internal LCD 150, the dual LCD folder-type mobile terminal slides the message across the external front LCD 190 display.

Figure 3:
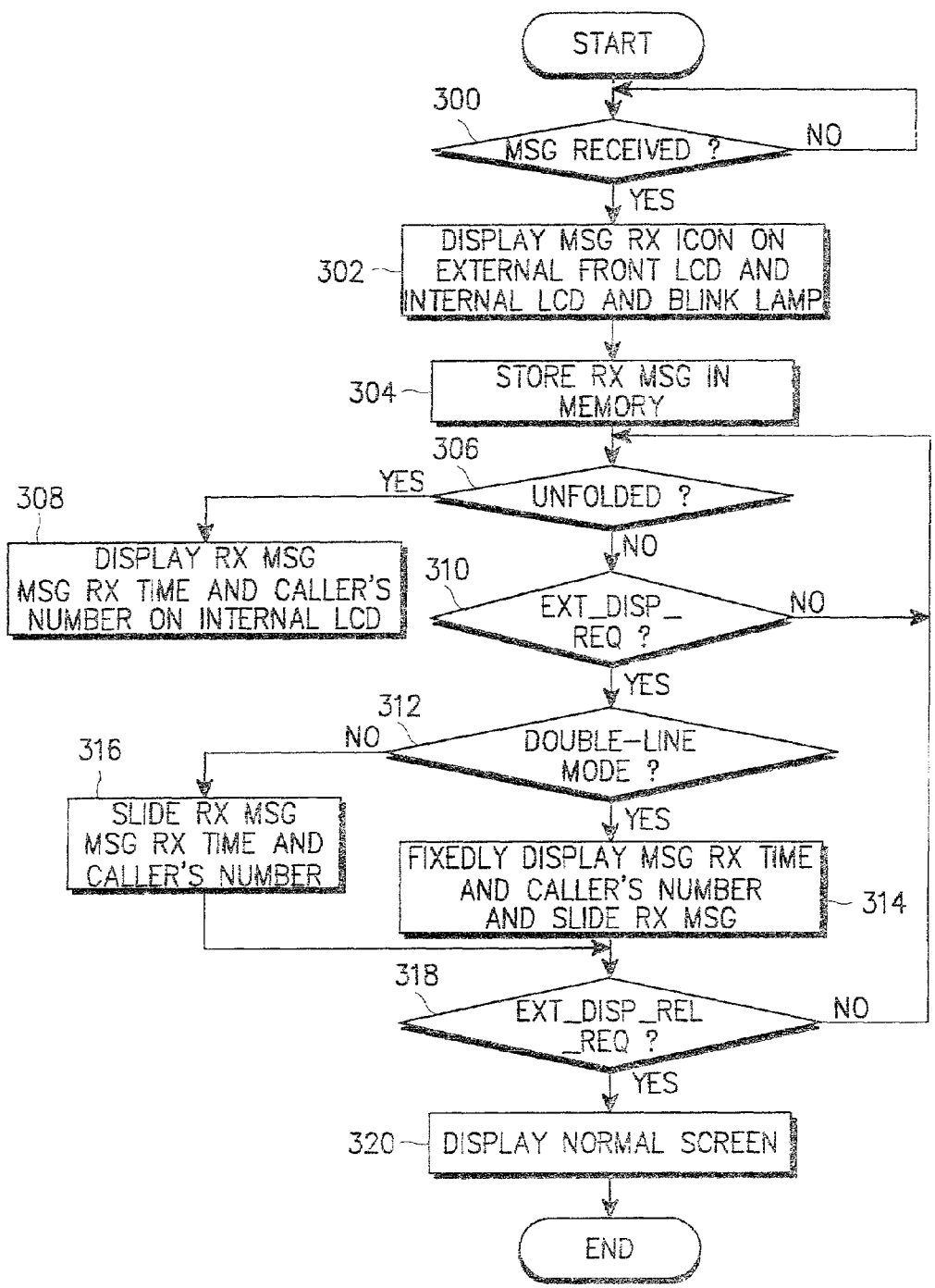
FIG. 3 is a flow chart illustrating a procedure for displaying a message in a dual LCD folder-type mobile terminal, according to an embodiment of the present invention.

FIG. 3 illustrates a procedure for displaying a message in the dual LCD folder-type mobile terminal, according to an embodiment of the present invention. The procedure of FIG. 3 is performed by the controller 200.

Figure 4:
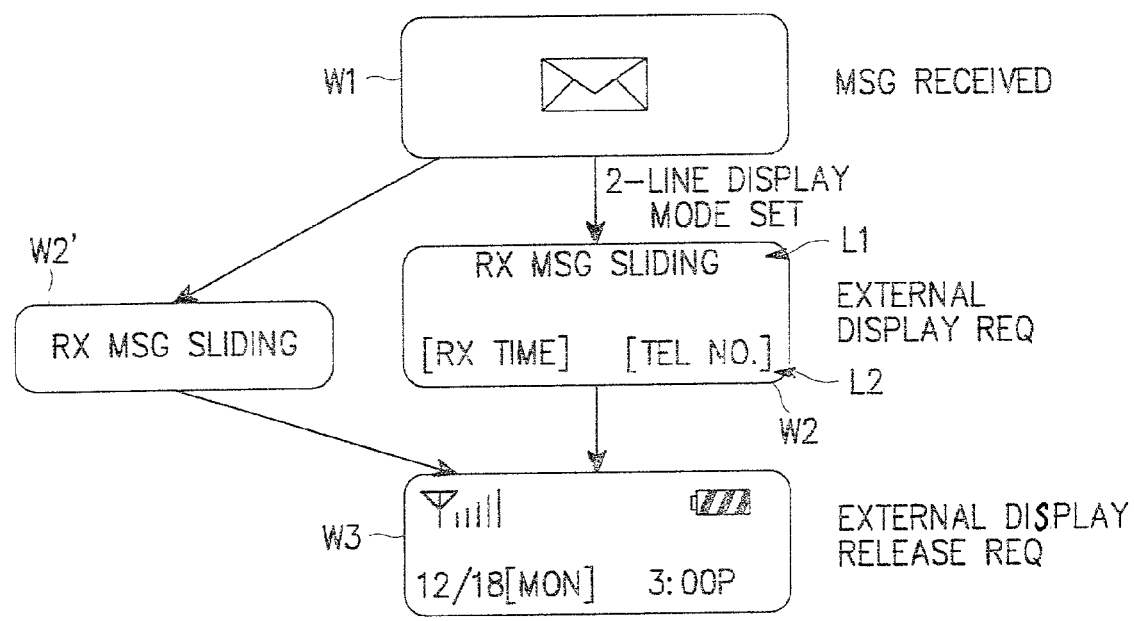
FIG. 4 is a diagram illustrating a screen layout displayed on the external front LCD of the dual LCD folder-type mobile terminal, according to an embodiment of the present invention.

FIG. 4 illustrates a screen layout displayed on the external front LCD 190 of the dual LCD folder-type mobile terminal, according to an embodiment of the present invention.

Now, with reference to FIGS. 1A to 4, a detailed description will be made regarding an operation of the embodiment of the present invention.

Upon receipt of such messages as a character message and a broadcast message, the controller 200 recognizes the received message in step 300 and then proceeds to step 302. In step 302, the controller 200 displays an icon indicating receipt of the message on both the external front LCD 190 and the internal LCD 150, and at the same time, a lamp (not shown) of mobile terminal 100 blinks indicating receipt of the message (or generates a buzzer tone). Those of ordinary skill in the art recognize that any means presently utilized to alert a user that a message has been received at a mobile terminal may be utilized by this invention. Preferably, the icon indicating receipt of the message has a shape of a postal envelope displayed on a window W1 of the external front LCD 190, as shown in FIG. 4.

Thereafter, in step 304, the controller 200 stores the received message in the memory 210. Preferably, the received message is stored together with its received time and a caller's phone number. In step 306, the controller 200 determines whether the sub-body 120 is unfolded. The controller 200 can recognize the unfolded state of the sub-body 120 depending on an output signal of the sensor 212.

If the sub-body 120 is unfolded by the user, the controller 200 performs the existing message display method, in step 308. That is, in step 308, the controller 200 displays the received message together with the message received time and the caller's phone number on a single screen of the internal LCD 150.

Otherwise, if the sub-body 120 is not unfolded by the user in step 306, the controller 200 determines, in step 310, whether an external display request is received from the user. The user will make the external display request when he or she desires to check the received message without unfolding the sub-body 120. Preferably, the external display request is achieved by pressing one of the keys mounted on the outside of the dual LCD folder-type mobile terminal. Those of ordinary skill in the art recognize that any type of key input may be utilized for an external display request. For example, the controller 200 recognizes the external display request when the user presses the volume up/down function key 180 shown in FIG. 1A in the folded state of the sub-body 120.

Upon receipt of the external display request from the user, in step 310, the controller 200 determines, in step 312, whether the external front LCD 190 is set to a double-line display mode. As mentioned above, the external front LCD 190 is relatively smaller in window size than the internal LCD 150. For example, the window size of the external front LCD 190 is small enough that a message must be displayed in a single line or a double line. Therefore, if the external front LCD 190 has a window size of a single line, it will be fixedly set to a single-line display mode. However, if the external front LCD 190 has a window size of a double line, it will be set to either a single-line display mode or a double-line display mode. If the external front LCD 190 is a color graphic LCD, it is possible to display the message in either a single line or a double line, according to the set display mode. Regardless of the window size of the external front LCD 190 the color graphic LCD supports a dot matrix display technique.

If the external front LCD 190 is set to the double-line display mode, in step 312, the controller 200 reads, in step 314, the received message together with the message received time and the caller's phone number from the memory 210, fixedly displays the message received time and the caller's phone number on the external front LCD 190, and slidingly displays the received message. In an example shown in FIG. 4, upon receipt of the external display request from the user, the controller 200 slides the received message displayed on a first line L1 to the left of a window W2 of the external front LCD 190, and fixedly displays the associated message received time and caller's phone number, stored in the memory 210, on a second line L2 of the window W2 of the external front LCD 190. As another example, it is also possible to display only one or none of the message received time and the caller's phone number on the second line L2. Further, it is also possible to slide the message received time and the caller's phone number, displayed on the second line L2.

Meanwhile, if the external front LCD 190 is not set to the double-line display mode, in step 312, the controller 200 reads, in step 316, the received message together with the associated message received time and caller's phone number from the memory 210 and slidingly, in sequence, displays the received message, the message received time and the caller's phone number on the external front LCD 190. In the example shown in FIG. 4, upon receipt of the external display request from the user, the controller 200 slides left the received message, the message received time and the caller's phone number, displayed on a window W2' of the external front LCD 190. As another example, it is also possible to display only one or none of the message received time and the caller's phone number.

In the embodiment of the present invention, the received message is slidingly displayed by the external front LCD 190, because the external front LCD 190 is too small in size to display the received message on the same window (or screen). The method for sliding the received message on the external front LCD 190 is as follows. The controller 200 sets a 100 ms timer and then shifts the characters displayed to the left and continuously shifts the characters to be displayed to the left on the external front LCD 190 by one byte every 100 ms interrupt, thereby sliding the received message. In addition, the received message may not continue shifting left when the last character of the received message such as the caller's phone number has been displayed. For example, when the final digit of the caller's phone number, for example "0" of "123-456-7890", has been displayed in external front LCD 190, no more characters relative to the received message will be displayed on external front LCD 190.

During the operation of step 314 or 316, the user can check the received message being slid, no matter how long it is. In addition, the user can also check the message received time and the caller's phone number.

In this state, if the user makes an external display release request, the controller 200 detects the external display release request, in step 318, and then proceeds to step 320. Preferably, the external display release request is achieved by pressing one of the keys mounted on the outside of the dual LCD folder-type mobile terminal. For example, the controller 200 recognizes the external display release request when the user presses the volume up/down function key 180, shown in FIG. 1A, while the received message is slidingly displayed on the external front LCD 190.

Upon receipt of the external display release request, the controller 200 displays a normal screen on the external front LCD 190, in step 320. For example, the controller 200 displays the RSSI bar, battery icon, date, day and current time on the external front LCD 190, as shown in a window W3 of FIG. 4.

As described above, the user can easily check such messages as the received message and the broadcast message, displayed on the external front LCD of the dual LCD folder-type mobile terminal, even without unfolding the sub-body.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for displaying a message in a folder-type mobile terminal including a main body, a sub-body foldably mounted to the main body, said sub-body having a first display mounted on an outer side and a second display mounted on an inner side thereof, the method comprising:
   upon receipt of a message, while the sub-body is folded, displaying an indicator indicating receipt of the message on the first display;
   upon receipt of a key input corresponding to a user's external display request, determining whether the first display is set to a double-line display mode;
   if the first display is set to the double-line display mode, slidingly displaying the received message on a first line of the first display and fixedly displaying a message received time and a caller's phone number on a second line of the first display; and
   if the first display is not set to the double-line display mode, slidingly displaying the received message, the message received time, and the caller's phone number on a single line on the first display.

2. The method as claimed in claim 1, wherein the received message is slidingly displayed by shifting the received message by a predetermined number of bytes each millisecond.

3. The method as claimed in claim 1, further comprising displaying initial information selected from the group consisting of a RSSI bar, a battery icon, a date, a day and a current time on the first display at a user's external display release request.

4. The method as claimed in claim 3, wherein the user's external display release request is received by pressing a key mounted on an outside of the folder-type mobile terminal.

5. The method as claimed in claim 1, further comprising displaying a message received time and a caller's phone number, following the received message, on the first display.

6. A method for displaying a message in a folder-type mobile terminal including a main body, a sub-body foldably mounted to the main body, said sub-body having a first display mounted on an outer side and a second display mounted on an inner side thereof, the method comprising:

upon receipt of a message, while the sub-body is folded, displaying an indicator indicating receipt of the message on the first display;

upon receipt of a key input corresponding to a user's external display request, determining whether the first display is set to a double-line display mode;

if the first display is set to the double-line display mode, slidingly displaying the received message on a first line of the first display and fixedly displaying a message received time and a caller's phone number on a second line of the first display; and if the first display is not set to the double-line display mode, slidingly displaying the received message on a single line on the first display.

7. The method as claimed in claim 6, wherein the received message is slidingly displayed by shifting the received message by a predetermined number of bytes each millisecond.

8. The method as claimed in claim 6, further comprising displaying initial information selected from the group consisting of a RSSI bar, a battery icon, a date, a day and a current time on the first display at a user's external display release request.

9. The method as claimed in claim 8, wherein the user's external display release request is received by pressing a key mounted on an outside of the folder-type mobile terminal.

10. The method as claimed in claim 6, further comprising displaying a message received time and a caller's phone number, following the received message, on the first display.

* * * * *